(12) United States Patent
Engh-Halstvedt et al.

(10) Patent No.: US 8,766,991 B2
(45) Date of Patent: Jul. 1, 2014

(54) PROCESSING ORDER WITH INTEGER INPUTS AND FLOATING POINT INPUTS

(75) Inventors: Andreas Due Engh-Halstvedt, Trondheim (NO); Jørn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 303 days.

(21) Appl. No.: 13/067,342

(22) Filed: May 25, 2011

(65) Prior Publication Data

US 2012/0299935 A1 Nov. 29, 2012

(51) Int. Cl.
*G09G 5/39* (2006.01)
*G06T 15/00* (2011.01)
*G06T 1/60* (2006.01)
*G06F 13/28* (2006.01)
*G06F 7/38* (2006.01)

(52) U.S. Cl.
USPC ........... 345/531; 345/522; 345/530; 345/533; 712/221; 712/222; 712/225

(58) Field of Classification Search
USPC .................. 345/501–574; 712/220–225, 228
See application file for complete search history.

(56) References Cited

U.S. PATENT DOCUMENTS

| | | | |
|---|---|---|---|
| 6,933,945 B2 * | 8/2005 | Emberling | 345/557 |
| 2010/0281239 A1 * | 11/2010 | Sudhakar et al. | 712/222 |
| 2011/0093686 A1 * | 4/2011 | Penton et al. | 712/222 |
| 2012/0066483 A1 * | 3/2012 | Boury et al. | 712/233 |
| 2012/0280973 A1 * | 11/2012 | Nagy | 345/419 |

OTHER PUBLICATIONS

Ewins et al., "Implementing an anisotropic texture filter", *Computer & Graphics*, 2000, pp. 253-267.
Cebenoyan et al., "Optimizing the Graphics Pipeline", *Nvidia*, 2003, 41 pages.

* cited by examiner

*Primary Examiner* — Xiao Wu
*Assistant Examiner* — Michael J Cobb
(74) *Attorney, Agent, or Firm* — Nixon & Vanderhye P.C.

(57) ABSTRACT

A graphics processing unit 2 includes a texture pipeline 6 which performs filter operations upon texture values. If the texture values are integer texture values, then they may be processed by the texture pipeline in a variable order corresponding to the order in which they are retrieved from a memory 4. If the texture values are floating point texture values, then they are processed in a fixed order in order to ensure result invariants as the filter operation is non-associative for floating point values. The filter operation is not commenced until all of the floating point texture values have been retrieved from the memory 4 and other available for processing.

17 Claims, 7 Drawing Sheets

PROCESSING ORDER WITH INTEGER INPUTS AND FLOATING POINT INPUTS

BACKGROUND OF THE INVENTION

1. Field of Invention

This invention relates to the field of data processing systems. More particularly, this invention relates to the ordering of processing operations within data processing systems.

2. Description of the Prior Art

It is known to provide data processing systems which use a plurality of input values in order to generate one or more result values. The input values may need to be fetched from a memory system. In some memory systems the input values may be returned in a variable order. Accordingly, in some known systems processing of the input values to generate the one or more result values does not take place until all of the input values have been received. This has the disadvantage that the input values need to be stored until they are used and that the processing may be delayed due to waiting for all the input values to be received before starting the processing.

In some data processing systems there is a strict requirement that a given set of input values should always produce the same results. In order to help in meeting this requirement it is known to enforce a requirement that processing operations performed to generate the results from the inputs should always be performed in the same order. This avoids the possibility that the results will be dependent upon the order in which processing operations are performed.

SUMMARY OF THE INVENTION

Viewed from one aspect the present invention provides apparatus for processing data comprising:

processing circuitry configured to compute one or more result values as a function of a plurality of input values;

a memory configured to store said plurality of input values;

load circuitry configured to issue one or more memory access requests to said memory to retrieve said plurality of input values from said memory and to supply said plurality of input values to said processing circuitry; wherein said plurality of input values are retrieved in a variable order from said memory; and said processing circuitry is configured such that:

(i) when said plurality of input values are integer format values, said processing circuitry performs processing upon said plurality of input values to compute said one or more result values in a variable order that is dependent upon said variable order in which said plurality of input values are retrieved from said memory; and (ii) when said plurality of input values are floating point format values, said processing circuitry performs processing upon said plurality of input values to compute said one or more result values in a fixed order that is independent of said variable order in which said plurality of input values are retrieved from said memory.

The present technique recognises that when the input values are in an integer format, then it may be safe to vary the order in which those input values are processed to generate the one or more result values. Accordingly, the order in which the input value is processed may be dependent upon the order in which the input values are retrieved from the memory. The easing of this constraint may permit for a reduction in the storage requirements of input values before they are consumed as well as permitting processing to commence sooner and potentially finish sooner. When the plurality of input values are floating point format values, then the processing circuitry does not permit a variable ordering in how the input values are processed. This both recognises and solves the problem that the result value may be dependent upon the order in which the input values are consumed when the input values are floating point format values.

The function relating the one or more result values to the plurality of input values can have a variety of different forms. The present technique is particularly useful when this function is associative when the plurality of input values are integer format values and is non-associative when the plurality of input values are floating point format values.

The variable order in which integer format input values are processed may vary in a number of different ways. In some embodiments the variable order may be the same as the order in which the plurality of input values are retrieved from the memory. This reduces the amount of temporary storage which needs to be provided for the input values when they are retrieved from the memory.

The fixed order in which the plurality of input values are processed when they have floating point formats may be such that in some embodiments the processing circuitry is configured to wait until all of the plurality of input values have been retrieved from the memory before commencing to compute the one or more result values in accordance with the processing in the fixed order.

The load circuitry may store the plurality of input values in a cache memory when they are retrieved from the memory (the memory may be a memory system, including higher levels of cache memory, main volatile memory and potentially further non-volatile memory) and the processing circuitry may read the input values from this cache memory.

The input values may be separately locked within the cache memory when they are stored in to the cache memory by the load circuitry. Each of the input values may then be separately unlocked within the cache memory when processing of that input value by the processing circuitry is finished. In this way, the input values are unlocked within the cache memory as soon as they are no longer required thus releasing space within the cache memory for the use by other data.

In order that the processing circuitry may determine when input values have been retrieved from memory, the load circuitry may be configured to set one or more flag bits associated with respective ones of the input values to indicate to the processing circuitry when each of the respective input values has been retrieved from the memory. The processing circuitry may examine these flag bits to determine when an input value is ready for the processing even when this has been received out-of-order with respect to the order in which those input values were requested from the memory.

The cache memory may have a plurality of cache lines in which an individual input value is stored either in a single cache line or spread across two cache lines. The flag bits set by the load circuitry may provide a flag bit for each cache line indicating that at least a portion of a respective one of the plurality of input values is stored within that cache line.

The present techniques may be applied in a variety of different processing fields. However, the field of graphics processing units is particularly data intensive and uses both integer format values and floating bit format values. In particular, the processing circuitry may be a texture pipeline within a graphics processing unit.

The graphics processing unit may perform filtering operations which require relatively large numbers of input values to be retrieved from memory. For example, the texture pipeline may be configured to perform a bilinear filtering operation upon four input texture values, possibly in a single pass through the texture pipeline, or a trilinear filtering operation upon eight input texture values, possibly in two passes through the texture pipeline with one or more result values being accumulated upon each pass. It is also possible that the filtering operation is an anisotropic filtering operation performed upon 4N input texture values, where N is an integer value greater than 2, in possibly N passes through the texture pipeline with result values being accumulated upon each pass.

When more than one pass through the texture pipeline is employed with texture values that are integer format values, then the texture values may be divided in to groups of four texture values in dependence upon the order in which the texture values are retrieved from the memory. Thus, as texture values are retrieved they may be collected in to groups of four and dispatched for processing through the texture pipeline without waiting for later arriving texture values. This reduces the storage requirements for the texture values and improves the speed with which the final result will be achieved.

Viewed from another aspect the present invention provides apparatus for processing data comprising:

processing means for computing one or more result values as a function of a plurality of input values;

memory means for storing said plurality of input values;

load means for issuing one or more memory access requests to said memory means to retrieve said plurality of input values from said memory means and to supply said plurality of input values to said processing means; wherein said plurality of input values are retrieved in a variable order from said memory means; and said processing means is configured such that:

(i) when said plurality of input values are integer format values, said processing means performs processing upon said plurality of input values to compute said one or more result values in a variable order that is dependent upon said variable order in which said plurality of input values are retrieved from said memory means; and (ii) when said plurality of input values are floating point format values, said processing means performs processing upon said plurality of input values to compute said one or more result values in a fixed order that is independent of said variable order in which said plurality of input values are retrieved from said memory means.

Viewed from a further aspect the present invention provides a method of processing data comprising the steps of:

storing a plurality of input values within a memory;

issuing one or more memory access requests to said memory to retrieve said plurality of input values from said memory means; and computing one or more result values as a function of a plurality of input values; wherein said plurality of input values are retrieved in a variable order from said memory means; and said processing means is configured such that:

(i) when said plurality of input values are integer format values, performing processing upon said plurality of input values to compute said one or more result values in a variable order that is dependent upon said variable order in which said plurality of input values are retrieved from said memory; and (ii) when said plurality of input values are floating point format values, performing processing upon said plurality of input values to compute said one or more result values in a fixed order that is independent of said variable order in which said plurality of input values are retrieved from said memory.

The above and other objects, features and advantages of this invention will be apparent from the following detailed description of illustrative embodiments which is to be read in connection with the accompanying drawings.

DESCRIPTION OF THE EMBODIMENTS

Figure 1:
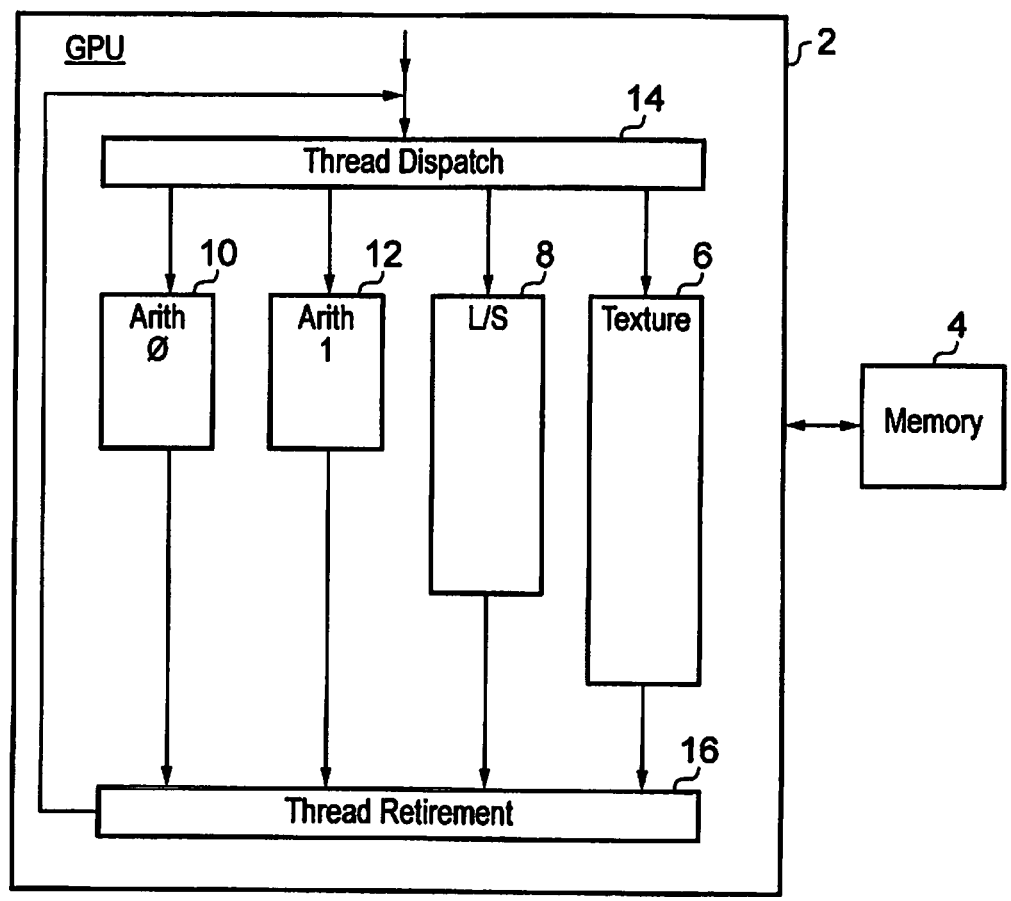
FIG. 1 schematically illustrates a graphics processing unit coupled to a memory system.

FIG. 1 schematically illustrates a graphics processing unit 2 coupled to a memory 4. The memory 4 may comprise a memory system formed of, for example, a level one cache, a level two cache, main volatile memory and possibly further non-volatile memory, such as a hard disk drive. The graphics processing unit 2 includes processing circuitry in the form of a plurality of processing pipelines including a texture pipeline 6, a load store pipeline 8, a first arithmetic pipeline 10 and a second arithmetic pipeline 12. Thread dispatch circuitry 14 is responsible for dispatching program instructions for execution in to the relevant processing pipelines 6, 8, 10, 12 and thread retirement circuitry 16 is responsible for retiring a program instruction from the respective processing pipelines 6, 8, 10, 12 when the program instruction has completed and retiring a thread comprising multiple program instructions when the thread has completed.

It will be appreciated by those in this technical field that the graphics processing unit 12 typically includes many further circuit elements and that these circuit elements have been omitted from FIG. 1 for the sake of simplicity. The present techniques will be described in the context of the texture pipeline 6. However, the present techniques could be applied in different pipelines, such as within the arithmetic pipelines 10, 12 or within different types of processing circuitry not limited to graphics processing units.

Figure 2:
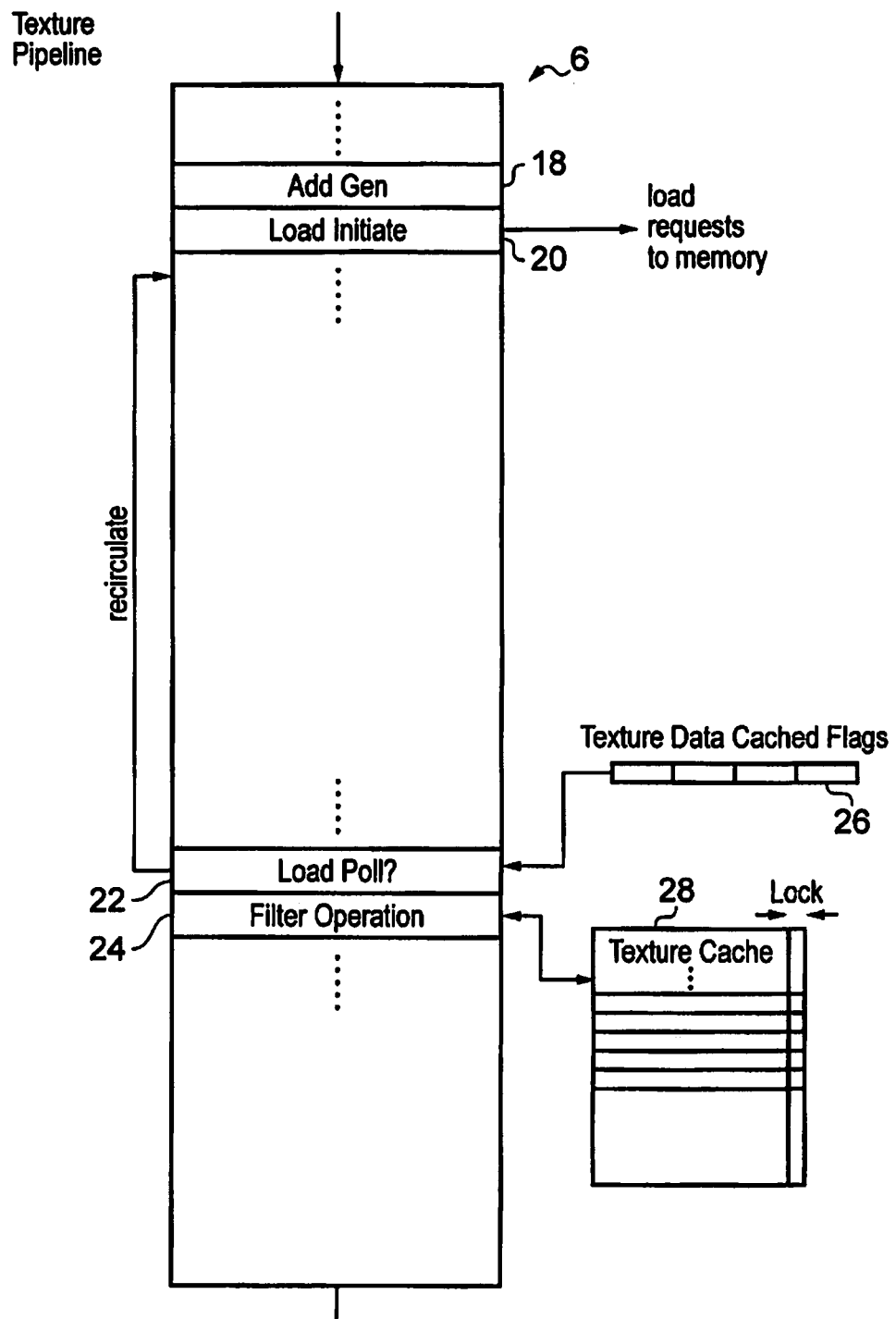
FIG. 2 schematically illustrates a texture pipeline from within the graphics processing unit.

FIG. 2 schematically illustrates the texture pipeline 6. The texture pipeline includes multiple pipeline stages, such as an address generation stage 18, a load initiate stage 20, a load poll stage 22 and a filter operation stage 24. It will be appreciated that in practice the texture pipeline may include many additional and/or alternative pipeline stages. Program instructions taken from a particular thread are dispatched in to the texture pipeline 6 by the thread dispatch circuitry 14. In accordance with multithreaded techniques commonly used within graphics processing units it will be appreciated that program instructions from many different threads are simultaneously present within the texture pipeline 6 occupying different stages. The program instructions progress along the texture pipeline 6 through the pipeline stages and perform particular processing operations at each pipeline stage.

The address generation stage 18 serves to generate addresses of texture data values to be retrieved from the memory 4. The load initiate stage 20 then serves as load circuitry and issues one or more memory access requests to the memory 4 in order to retrieve a plurality of texture values from the memory to be supplied back to the texture pipeline 6.

At a later stage in the texture pipeline 6, a load poll stage 22 serves to determine what texture values for the program instruction which initiated the load at load initiate stage 20 have been returned from the memory 4. This may be determined by referencing texture data cached flags 26 which store two flag bits for each texture value indicating whether that texture value has been stored in to a texture cache 28 and whether that texture value occupies a single cache line or two cache lines within the texture cache 28. Depending upon the availability of texture values (input values) to be processed, the filter operation stage 24 performs a filtering operation, such as a bilinear filtering operation, part of a trilinear operation or part of an anisotropic operation, upon the texture values which have been retrieved from the memory 4 and stored in to the texture cache 28. In this example embodiment the filter operation stage 24 can process four texture values in one pass and accordingly is able to perform a bilinear filtering operation in one pass if all four texture values that are inputs to that bilinear filtering operation are available. In the case of a trilinear filtering operation or an anisotropic filtering operation, the filter operation stage 24 does not have sufficient hardware capability to process the required number of texture inputs in a single pass and accordingly multiple passes through the texture pipeline 6 are required to accumulate the result value for such more computationally intensive filter operations.

It will be appreciated that the texture data cached flags 26 is illustrated with four entries, but in practice more entries may be utilised in relation to filtering operations which have more texture values as input values since this higher number of texture values will need to be tracked as having being stored in to the texture cache 28 and processed as part of an accumulation operation producing the final result value.

Figure 3:
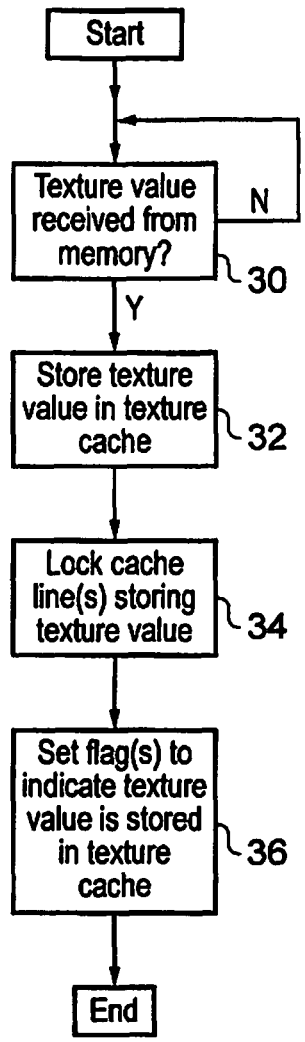
FIG. 3 is a flow diagram schematically illustrating the response to a texture value received from memory.

FIG. 3 is a flow diagram schematically illustrating the loading of texture values from the memory 4. A memory fetch operation is initiated by the load initiate stage 20. Processing then waits at step 30 until a texture value is received from the memory 4. Step 32 stores that texture value in to the texture cache 28. Step 34 sets a locked flag for the cache line or cache lines in to which the texture value has been stored. Setting of this lock flag prevents the cache line concerned being flushed from the texture cache 28 until the locked flag is reset. The locked flag is reset when the texture value is consumed by the filter operation and is no longer required. Locking of the texture value in the cache 28 ensures that when the texture value is marked as having been retrieved by setting of the texture data cached flags 26, then the texture value will remain available within the texture cache 28 until it is needed. Setting of the flag or flags within the texture data cached flags 26 is performed at step 36 to indicate to the load poll stage 22 that the data which the load initiate stage 20 sought to fetch from the memory 4 has been retrieved and is present within the texture cache 28.

Figure 4:
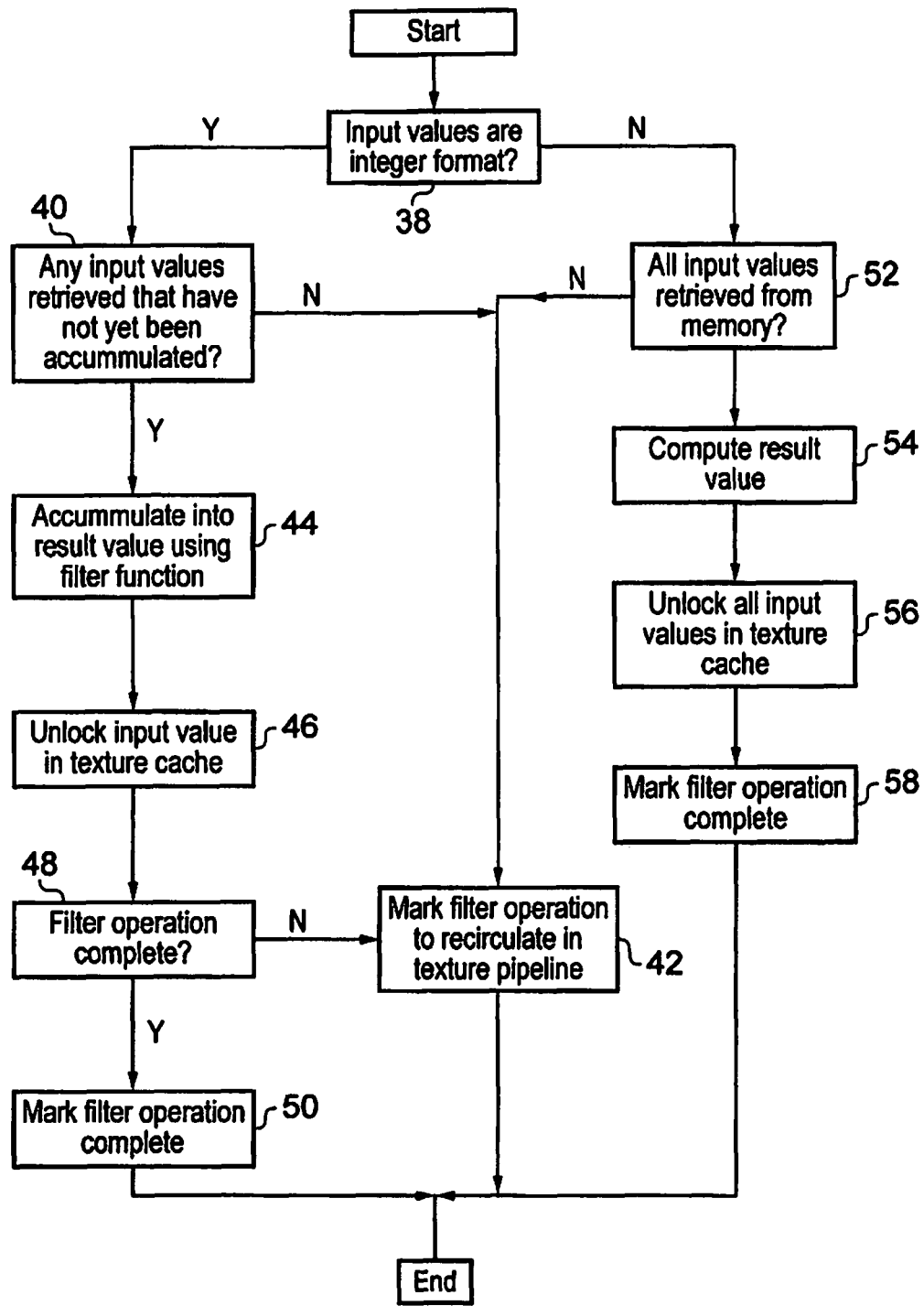
FIG. 4 is a flow diagram schematically illustrating control of processing of a filter operation within the texture pipeline.

FIG. 4 is a flow diagram schematically illustrating processing performed by the filter operation stage 24. At step 38 a determination is made as to whether or not the input values (texture values) have an integer format. This may be determined from decoding the instruction being processed (or could be, for example, determined from an examination of the format of the texture values themselves). If the input values have an integer format, then processing proceeds to step 40 where a determination is made as to whether or not any input values have been retrieved from the memory 4 and have not yet been subject to filter processing and accumulated in to the final result value. If there are no such input values available for processing, then control passes to step 42 where the filter operation (program instruction) is marked to be recirculated back through the texture pipeline 6 when input values may be available for processing. This recirculation is illustrated in FIG. 2 and extends from the load poll stage 22 which determines whether or not input values are available for processing back to a stage following the load initiate stage 20 (the load initiate stage 20 does not need to be reactivated as the load operation has already been initiated).

If the determination at step 40 is that input values are retrieved and available to be accumulated, then processing passes to step 44 where the input values concerned are accumulated in to the result value using the required filter function. This may be part of a bilinear filter, a trilinear filter or an anisotropic filter as will be discussed later. The processing at step 44 may, in this example embodiment, process up to four texture values in any one pass through the filter operation stage 24. In this way, a bilinear filter operation may be completed in a single pass if all of the input values are available. A trilinear filter operation which processes eight input values may be completed in, at best, two passes through the filter operation stage 24 whereas an anisotropic filter operation which uses 4N input values, where N is an integer greater than 2, will take, at best, N passes through the filter operation stage 24. If fewer than four input values of an integer format are available when a program instruction reaches the filter operation stage 24, then the filter operation stage 24 may accumulate in to the result value the portion of the result value dependent upon the available input values even though not all of the capability of the filter operation stage 24 is being utilised. Doing this accumulation as soon as possible increases the likelihood that the filter operation will complete more quickly when the remaining input values become available.

The ability of the filter operation stage 24 to accumulate in to the result value as and when the input values become available is permitted as the filter operation function is associative with respect to input values that have an integer format. The filter function is non-associative in respect of input values which have a floating point format and accordingly this technique may not be used for input values which have a floating point format as strict invariance of the result in dependence upon the input values required.

Step 46 serves to unlock the input values in the texture cache 28 when they have been consumed and accumulated in to the result value as step 44. Step 48 determines whether or not the filter operation is complete. The filter operation is complete if all of the input values have been accumulated (subject to their associated weighting) in to the result value. The consuming of all of the input values may be tracked using the texture data cache flags 26. If the filter operation is not complete, then processing proceeds to step 42. If the filter operation is complete, then processing proceeds to step 50 where the program instruction is marked as completed so that it may be retired from the pipeline by the thread retirement circuitry 16 and not recirculated back to be dispatched in to the texture pipeline 6 at a later time.

If the determination at step 38 is that the input values do not have integer format, then they have a floating point format. Floating point input values result in the filter operation being non-associative and accordingly the filter operation should be performed in a fixed order with each of the input values being processed in a fixed order so that the result value will be invariant. Step 52 determines whether all of the input values required by the filter operation had been retrieved from the memory 4 and are stored within the texture cache 28. If all of the input values have not yet been retrieved and stored within the texture cache 28, then processing proceeds to step 42. If all of the input values are present within the texture cache 28, then processing proceeds to step 54 where the result value is computed in accordance with the predetermined fixed processing order of the input values. Step 56 then unlocks all of the input values in the texture cache 28 and step 58 marks the filter operations as complete. It will be appreciated that the requirements at step 52 that all of the input values must be retrieved from the memory and present within the texture cache 28 before computation of the result value may be commenced has the consequence that there will typically be a longer delay between loading of the input values first being initiated and processing of those input values being commenced and completed.

It is possible that other embodiments may use a more complex approach and still execute the input values in accordance with a fixed invariant ordering even though they have not all yet been received. For example, if the filter operation stage 24 is able to process four input values at a time, then when the first four input values in the fixed order have been received, then they may be processed even if some later input values have not yet been received. When the next four input values in the fixed order have been received, then again these may be processed even though later input values have not yet been received. This would ensure that the processing was performed in the fixed order required for an invariant result when using input values having a floating point format.

Figure 5:
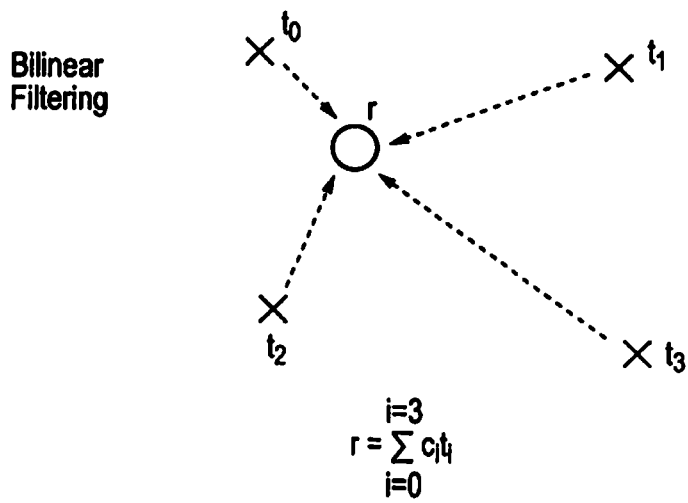
FIG. 5 schematically illustrates a bilinear filtering operation.

FIG. 5 illustrates a bilinear filtering operation. In a bilinear filtering operation a result value is determined as a sum of weighted texture values taken from four texture value positions surrounding the position of a pixel corresponding to the result value. Such a function is associative for integer formats but is non-associative, at least in some cases, for floating point format input values.

Figure 6:
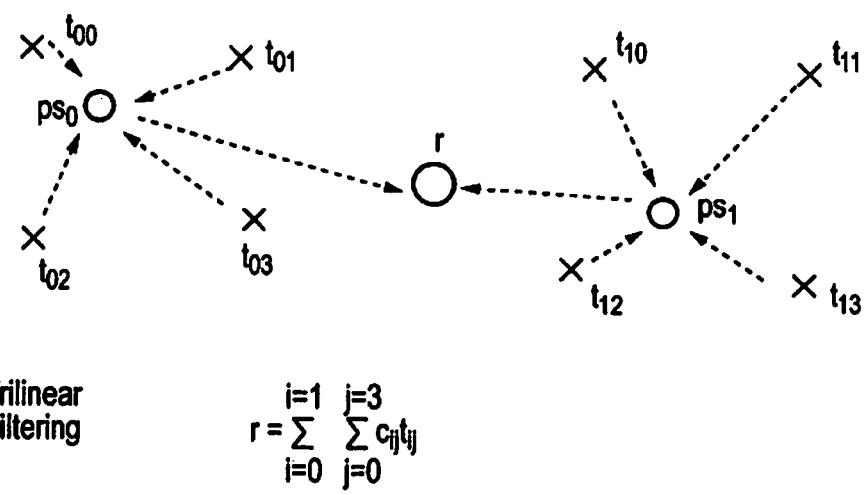
FIG. 6 schematically illustrates a trilinear filtering operation.

FIG. 6 schematically illustrates a trilinear filtering operation. In this case the result value is formed as an accumulation in to the result value of partial sum (ps) values which are themselves each a result of a bilinear filtering operation. Again this function is associative for integer input values and non-associative for floating point input values.

Figure 7:
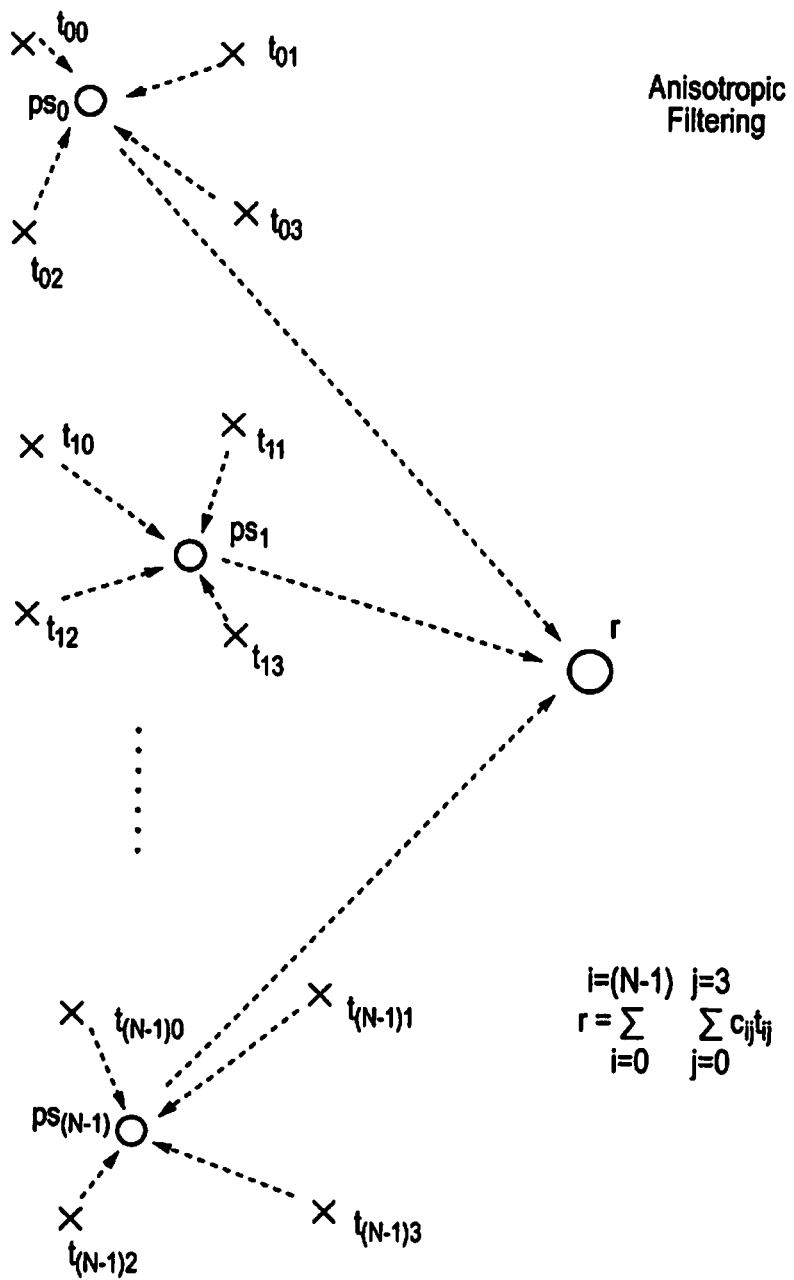
FIG. 7 schematically illustrates an anisotropic filtering operation.

FIG. 7 is similar to FIG. 6 but in this case illustrates an anisotropic filtering operation which is formed as N bilinear filtering operations each feeding a partial sum (ps) in to a final result value. The anisotropic filtering operation is associative for integer input values and is non-associative for floating point input values.

Figure 8:
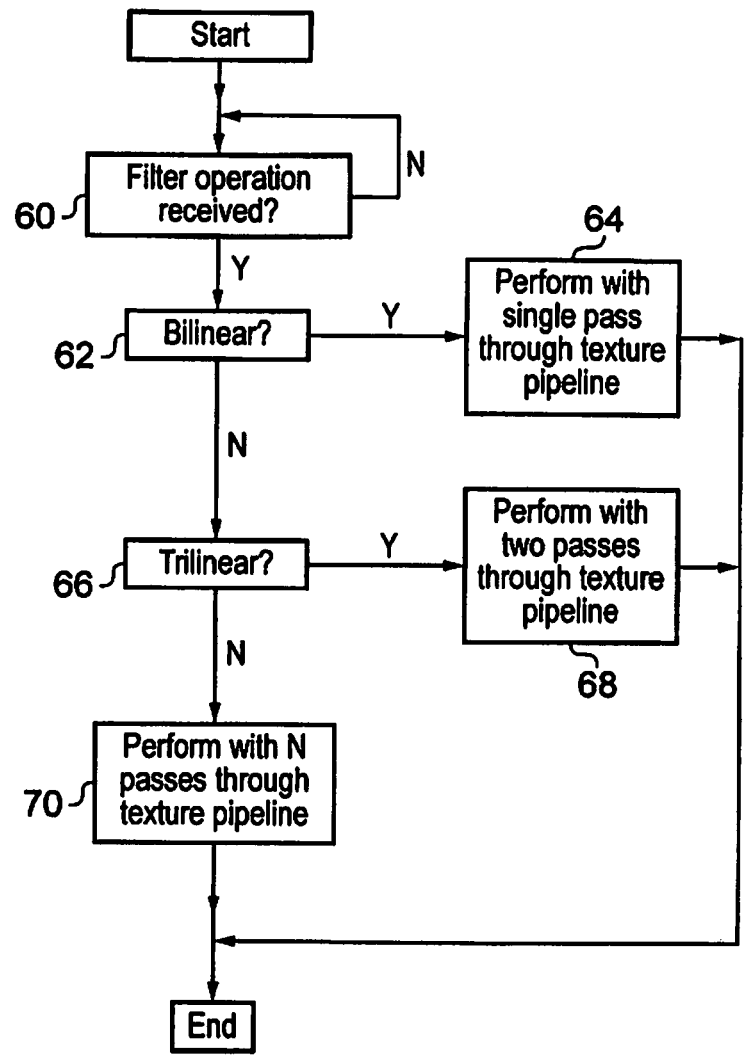
FIG. 8 schematically illustrates control of processing of a received filter operation.

FIG. 8 is a flow diagram schematically illustrating control of processing of a filtering operation within the texture pipeline 6. At step 60 a filter operation is received. At step 62 a determination is made as to whether or not that filtering operation is a bilinear filtering operation. If the filtering operation is a bilinear operation, then step 64 performs the operation in a single pass through the texture pipeline 6. In practice it would be appreciated that this is a best-case scenario and relies upon all of the input values being available in time for the filtering to be performed at the first pass of the program instruction through the texture pipeline 6. If only some of the input values are available, then the program instruction may be recirculated however many times are necessary in order for the final result value to be accumulated and all of the input values to be consumed. This behaviour is also the case in relation to trilinear filter operations and anisotropic operations, which in the best case are performed in two passes through the texture pipeline or in N passes through the texture pipeline (for an anisotropic filter operation having 4N input values and a filter operation stage 24 consuming four input values at each pass).

If the determination at step 62 is that the filter operation is not bilinear then processing proceeds to step 66 where a determination is made to as whether or not the filter operation is a trilinear operation. If the processing operation is a trilinear operation, then this is performed at step 68 with two passes through the texture pipeline 6.

If the determination at step 66 is that the filter operation is not a trilinear filter operation then the filter operation is an anisotropic filter operation and this is performed with N passes through the texture pipeline at step 70.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Apparatus for processing data comprising:
processing circuitry configured to compute one or more result values as a function of a plurality of input values;
a memory configured to store said plurality of input values;
load circuitry configured to issue one or more memory access requests to said memory to retrieve said plurality of input values from said memory and to supply said plurality of input values to said processing circuitry; wherein
said plurality of input values are retrieved in a variable order from said memory; and
said processing circuitry is configured such that:
(i) when said plurality of input values are integer format values, said processing circuitry performs processing upon said plurality of input values to compute said one or more result values in a variable order that is dependent upon said variable order in which said plurality of input values are retrieved from said memory; and
(ii) when said plurality of input values are floating point format values, said processing circuitry performs processing upon said plurality of input values to compute said one or more result values in a fixed order that is independent of said variable order in which said plurality of input values are retrieved from said memory.

2. Apparatus as claimed in claim 1, wherein said function is associative when said plurality of input values are integer format values and is non-associative when said plurality of input values are floating point format values.

3. Apparatus as claimed in claim 1, wherein when said processing circuitry is configured to process said plurality of input values in accordance with said variable order in an order in which said plurality of input values are retrieved from said memory.

4. Apparatus as claimed in claim 1, wherein said processing circuitry is configured to process said plurality of input values in accordance with said fixed order by waiting until all of said plurality of input values have been retrieved from said memory before commencing to compute said one or more result values.

5. Apparatus as claimed in claim 1, comprising a cache memory and wherein said load circuitry stores said plurality of input values in said cache memory and said processing circuitry reads said plurality of input values from said cache memory.

6. Apparatus as claimed in claim 5, wherein each of said plurality of input values is separately locked within said cache memory when stored in said cache memory by said load circuitry and each of said plurality of input values is separately unlocked within said cache memory when processing of said input value by said processing circuitry has finished.

7. Apparatus as claimed in claim 1, wherein said load circuitry sets one or more flag bits associated with respective ones of said plurality to input values to indicate to said processing circuitry when each of said plurality of input values has been retrieved from said memory.

8. Apparatus as claimed in claim 7, comprising a cache memory have a plurality of cache lines and wherein an individual one of said plurality of input values is stored by said load circuitry in one of a single cache line or spread across two cache lines, said one or more flag bits comprising a flag bit for each cache line indicating if at least a portion of a respective one of said plurality of input values is stored within said cache line.

9. Apparatus as claimed in claim 1, wherein processing circuitry is a texture pipeline within a graphics processing unit.

10. Apparatus as claimed in claim 9, wherein texture pipeline configured to perform a bilinear filtering operation upon four input texture values.

11. Apparatus as claimed in claim 10, wherein said texture pipeline is configured to perform said bilinear filtering operation in a single pass through said texture pipeline.

12. Apparatus as claimed in claim 11, wherein said texture pipeline is configured to perform a trilinear filtering operation upon eight input texture values in two passes through said texture pipeline with said one or more result values being accumulated upon each pass.

13. Apparatus as claimed in claim 12, wherein when said eight texture values are integer format values and are processed by said texture pipeline in two groups of four texture values, said eight texture values being divided into said two groups of four texture values in dependence upon an order in which said texture values are retrieved from said memory.

14. Apparatus as claimed in claim 11, wherein said texture pipeline is configured to perform an anisotropic filtering operation upon 4N input texture values, where N is an integer greater than 2, in N passes through said texture pipeline with said one or more result values being accumulated upon each pass.

15. Apparatus as claimed in claim 14, wherein when said 4N texture values are integer format values and are processed by said texture pipeline in N groups of four texture values, said 4N texture values being divided into said N groups of four texture values in dependence upon an order in which said texture values are retrieved from said memory.

16. Apparatus for processing data comprising:
processing means for computing one or more result values as a function of a plurality of input values;
memory means for storing said plurality of input values;
load means for issuing one or more memory access requests to said memory means to retrieve said plurality of input values from said memory means and to supply said plurality of input values to said processing means; wherein
said plurality of input values are retrieved in a variable order from said memory means; and
said processing means is configured such that:
(i) when said plurality of input values are integer format values, said processing means performs processing upon said plurality of input values to compute said one or more result values in a variable order that is dependent upon said variable order in which said plurality of input values are retrieved from said memory means; and
(ii) when said plurality of input values are floating point format values, said processing means performs processing upon said plurality of input values to compute said one or more result values in a fixed order that is independent of said variable order in which said plurality of input values are retrieved from said memory means.

17. A method of processing data comprising the steps of:
storing a plurality of input values within a memory;
issuing one or more memory access requests to said memory to retrieve said plurality of input values from said memory; and
computing one or more result values as a function of a plurality of input values; wherein
said plurality of input values are retrieved in a variable order from said memory; and wherein:
(i) when said plurality of input values are integer format values, performing processing upon said plurality of input values to compute said one or more result values in a variable order that is dependent upon said variable order in which said plurality of input values are retrieved from said memory; and
(ii) when said plurality of input values are floating point format values, performing processing upon said plurality of input values to compute said one or more result values in a fixed order that is independent of said variable order in which said plurality of input values are retrieved from said memory, the above steps are implemented on a data processing apparatus.

* * * * *